United States Patent [19]

Pelzer et al.

[11] 4,145,173
[45] Mar. 20, 1979

[54] FILM-FORMING HEAD

[75] Inventors: Rudolf Pelzer, Herzogenrath; Heinz Scholl, Eschweiler, both of Fed. Rep. of Germany

[73] Assignee: Saint-Gobain Industries, Neuilly-sur-Seine, France

[21] Appl. No.: 783,343

[22] Filed: Mar. 31, 1977

[30] Foreign Application Priority Data

Apr. 5, 1976 [DE] Fed. Rep. of Germany ....... 2614560

[51] Int. Cl.² ............................................. B29D 7/02
[52] U.S. Cl. .................................... 425/224; 425/141; 425/145; 425/447; 425/466
[58] Field of Search ................ 425/141, 223, 145, 224, 425/466, 447

[56] References Cited

U.S. PATENT DOCUMENTS

| | | | |
|---|---|---|---|
| 2,330,282 | 9/1943 | Hazeltine et al. | 425/224 X |
| 2,566,854 | 9/1951 | Rhodes | 425/141 X |
| 2,754,544 | 7/1956 | Bicker, Jr. | 425/224 |
| 3,347,962 | 10/1967 | Dieck et al. | 425/224 |
| 3,632,244 | 1/1972 | Sturgeon et al. | 425/141 X |
| 3,884,611 | 5/1975 | Anderson et al. | 425/466 X |
| 3,940,221 | 2/1976 | Nissel | 425/141 |

Primary Examiner—Robert L. Spicer, Jr.
Attorney, Agent, or Firm—John T. Synnestvedt; M. Richard Page

[57] ABSTRACT

Apparatus and a method for forming a uniform film of plastic material, having good optical characteristics, on a substrate are disclosed. The plastic material is supplied to and maintained under pressure in a distribution channel and is fed from the distribution channel through a narrow slot to the substrate. A forming member subsequently forms the plastic material into a uniform film on the substrate. The level of the plastic material in front of the forming member is limited to a range of values based upon the thickness of the film being formed.

9 Claims, 4 Drawing Figures

FILM-FORMING HEAD

BACKGROUND OF THE INVENTION

This invention relates to methods and apparatus for forming a highly uniform film of plastic material on a plan substrate.

There are several known apparatus and methods for depositing layers of plastic material on a plan substrate. For obtaining a very uniform, homogeneous film of transparent plastic, with an optical quality corresponding to that of silicate flat glass, a casting head with a doctor blade is normally used. Known casting heads consist of a trough that is filled with plastic material, the trough being continuously refilled by one or more supply pipes.

It has been found that the presently-known casting heads do not provide a sufficiently homogeneous film to satisfy the exacting optical characteristics and qualities desired. This is particularly the case when casting multi-component reactive plastic materials that are mixed together just prior to casting. It is common for optical distortions to occur in such films in the form of streaks that are within the film or in the form of surface irregularities or unevenness.

SUMMARY OF THE INVENTION

The object of this invention is a film-forming apparatus and method that improves the uniformity and homogeneity of the plastic film so that streaking and surface irregularities are reduced.

According to one feature of the invention, the means for feeding the plastic material to the substrate comprises a feeding means extending essentially along the entire width of the member that forms the plastic material on the substrate. The feeding means comprises a distribution channel into which the plastic material is supplied and in which the plastic material is held under a high hydrostatic pressure. The feeding means further comprises a narrow slot, extending the length of the distribution channel, for supplying plastic material to the substrate. The invention further contemplates limiting the height of the plastic material deposited on the substrate in front of the forming member.

It has been found that film-forming heads designed and operated in accordance with the invention herein disclosed, produce streak-free and optically-flawless plastic films, even with the very difficult to use multi-component reactive resin systems. This improvement is believed to result from the optimization of flow conditions within the film-forming head. The explanation for the problems observed with respect to known casting heads appears to be that portions of the flow of plastic material cover varying distances between the supply system and the point of discharge onto the substrate; portions of the flow can become stalled in certain areas, causing the portions of the flow to dwell within the coating device for unequal time periods. When using multi-component reactive resin systems, the reactants are first mixed and then the mixture is supplied to the film-forming apparatus. The viscosity of the resin changes as a function of time. In the prior known designs, in which portions of the flow of resin spend varying times in the supply system, the resin deposited on the substrate does not have a uniform viscosity and this results in the distortions noted.

It is believed that the differing dwell times in the known designs result from the use of a trough, which is unfavorable to uniform flow, creating stalled zones of flow in which the resin dwells longer.

The film-forming head according to the invention avoids the above-noted shortcomings of known designs. The means for feeding the plastic material includes a distribution channel and a thin slot. The diameter of the distribution channel and the gap of the slot are interrelated so that the plastic material in the distribution channel is maintained under pressure despite the discharge of plastic material through the slot, that is disposed along the entire length of the distribution channel; thus the pressure at the inlet of the slot is substantially the same at all points. Expressed in other terms, the dynamic pressure must be negligible as compared with the static pressure.

While the first characteristic of the invention guarantees the uniform distribution of the plastic material, the second characteristic, that is maintaining the height of the reserve of material in front of the forming member, guarantees that the quantity of material in front of the outlet of the slot is maintained at a certain minimum plugging quantity and, in this way, dead spaces or air pockets are eliminated. In order to avoid the introduction of air into the mixture, there must not be an air space existing between the outlet of the slot and the supply of plastic material that has been discharged onto the substrate.

In one preferred embodiment of the invention, the gap of the slot is from 0.1 to 0.5 mm, and more preferably, from 0.15 to 0.4 mm; the length of the slot between the distributing channel and the outlet of the slot is from 10 to 100 mm, and preferably, from 20 to 80 mm. Such dimensions yield the best conditions for obtaining uniform distribution of the plastic material.

In a further preferred embodiment of the invention, the cross-section of the distributing channel is reduced uniformly, and the cross-sectional area of the distributing channel decreases linearly from the center — i.e. the point, where the central feeding conduit (tube) communicates with the distribution channel — to both ends of the channel to a first value, which is 5% of the maximum cross-sectional area in the center of the channel. This feature optimizes flow conditions of the plastic material within the distributing channel.

According to another feature of the invention, the means for limiting the amount of material supplied in front of the forming member is designed so that the height of the material is at least 1.2 times but not more than 15 times the thickness of the film. This height limitation can be achieved in several ways. According to one embodiment, the means for limiting the height of the material comprises a continuous wall placed between the outlet of the channel and the forming member; in this embodiment, the cavity between this wall and the substrate is entirely filled with plastic material and this mass of plastic material forms a mass that can be freely extended and that also acts as a buffer or stopper for preventing the introduction of air.

According to another embodiment, the means for limiting the height of the reserve of material in front of the forming means includes a sensing device for sensing the level of plastic material and means responsive to the sensing device for controlling the amount of plastic material supplied to the distributing channel.

DESCRIPTION OF THE PREFERRED EMBODIMENTS

Figure 1:
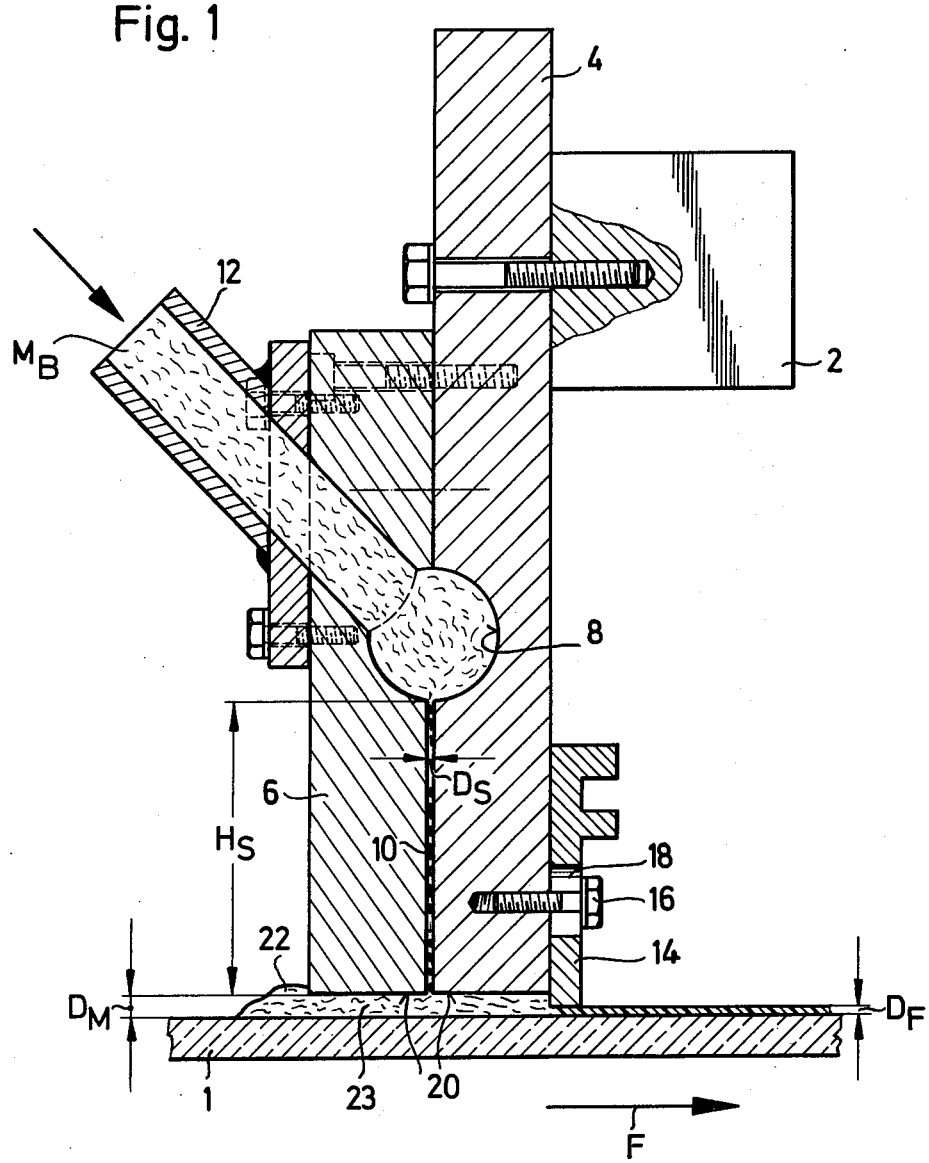
FIG. 1 shows a vertical cross-section of a first embodiment of a film-forming head according to the invention.

In FIG. 1, a film-forming head is shown mounted on a carrier or support 2 that extends laterally above and across a substrate 1 on which a film of plastic material is to be formed. During the film forming operation, the substrate 1 moves at a constant velocity relative to the head in the direction of arrow F. The film forming head comprises metal die plates 4 and 6 that are secured tightly together by bolts located in the upper portions of the plates. A distribution channel 8 extends along the entire usable width of the film forming head and is closed at its ends by two lateral walls, not illustrated in FIG. 1. The diameter of the distributing channel 8 varies from about 15–50 mm, depending on the desired flow of material. A slot 10 is formed between the plates 4 and 6 below the distribution channel 8. The slot is in fluid communication with the channel 8 and extends essentially along the entire length of the channel 8. The surfaces of the slot 10 are polished and the gap $D_S$ of the slot has a tolerance no less than 0.01 mm. The length $H_S$ of the slot is preferably from 10 to 60 mm, and the slot gap is preferably 0.15 to 0.40 mm. The working material $M_B$ is fed through a central inlet 12 by means of a pump to provide the necessary high hydrostatic pressure in the distributing channel 8.

The doctor blade 14 is mounted on the die plate 4 by means of bolts 16 that extend through oblong slots 18. Both plates 4 and 6 have flat surfaces 20 adjacent the outlet of the slot. The distance $D_M$ of faces 20 from the substrate 1 should be at least 1.2 times the thickness $D_F$ of the film of plastic material but not more than about 15 times $D_F$, to avoid zones of stalled flow in the space between the surfaces 20 and the upper surface of the substrate, which space is filled by a reserve of material 23. At the side of the head opposite the doctor blade or straight edge 14, the material discharged from the slot forms a ridge 22 that acts as a buffer or stopper. The distance $D_M$ is set to allow a continuous flow of material toward the ridge 22.

The film-forming head just described, as well as all other embodiments described below, can be mounted on laterally arranged runners by which it rests directly on and slides on the substrate. This assures that the head is disposed parallel to the substrate to be covered. An auxiliary suspension system for the head can be employed to allow reduction of force with which the head bears on the substrate so that the substrate slides with relatively low pressure applied to it by the head.

Figure 2:
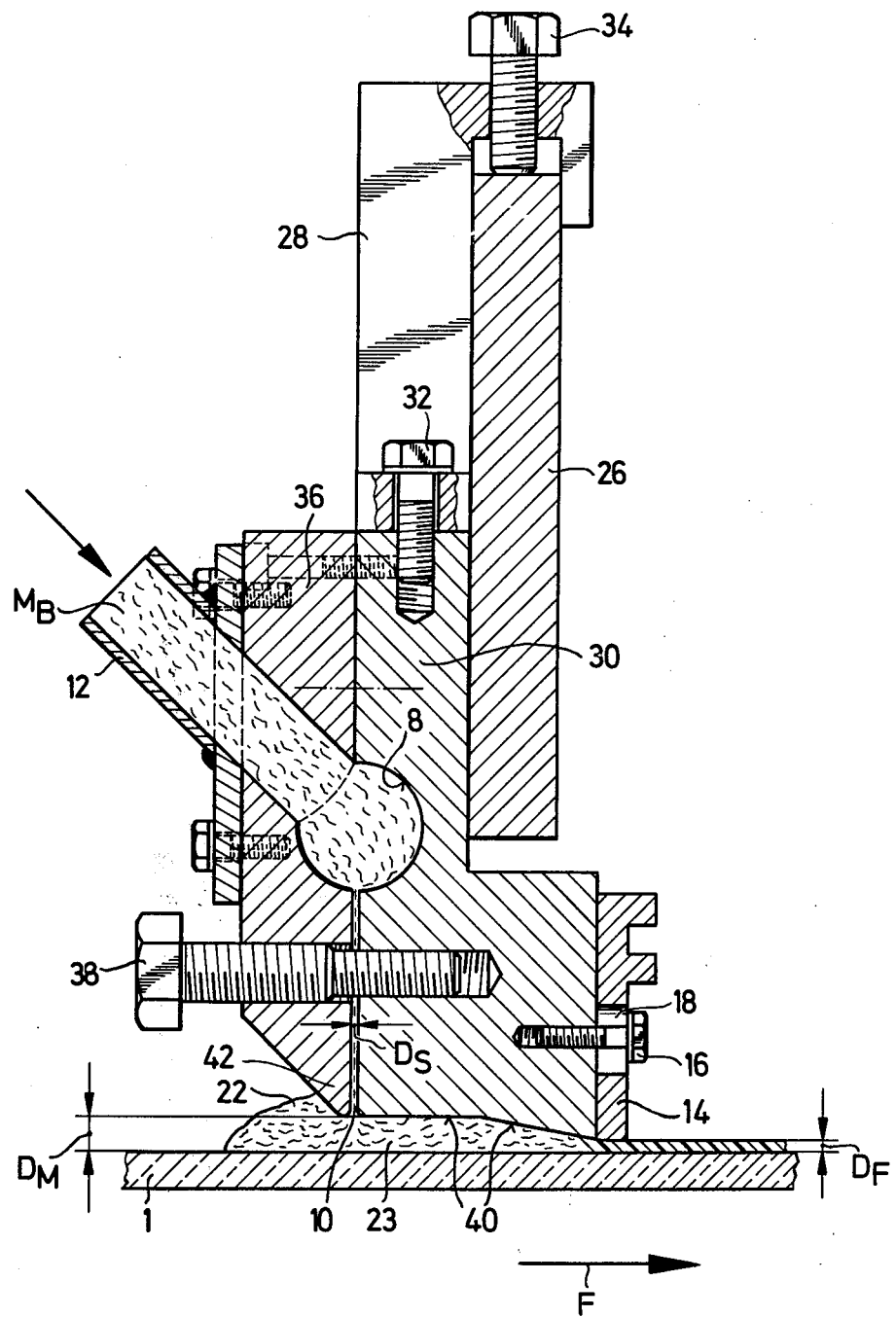
FIG. 2 illustrates a vertical cross-section of a second embodiment of a film-forming head according to the invention.

The film-forming head illustrated in FIG. 2 is mounted by means of a plurality of hangers 28 on beam 26 that is supported above the substrate 1. The hangers 28 straddle the beam 26 and are bolted to the die plate 30. The distance of the film-forming head from the substrate 1 can be adjusted by means of adjustment bolts 34. Plate 36 is bolted to plate 30 and together they form the distributing channel 8 and a feed slot 10. The dimensions of the slot 10 are of the same order as those of the FIG. 1 embodiment. The lower part of plate 36, that forms the slot 10, is attached to the plate 30 by differential bolts 38. The shanks of the bolts 38 have two threaded sections of different diameters and of a slightly different pitch, and this enables fine adjustment of the gap of the slot 10.

The end of the die plate 30 can serve as a doctor blade. Preferably, the edge of the plate 30 carries a blade 14, the setting of which can be accomplished as in the preceeding embodiment by bolts 16 extending through oblong slots 18. A portion 40 of the lower face of the plate 30 slopes downwardly toward the doctor blade 14, thus resulting in the gradual reduction of the space between the surface 40 and the substrate. The lip 42 of the die plate 36 slopes upwardly and forms a relatively large buffer space for the material that forms ridge 22.

Figure 3:
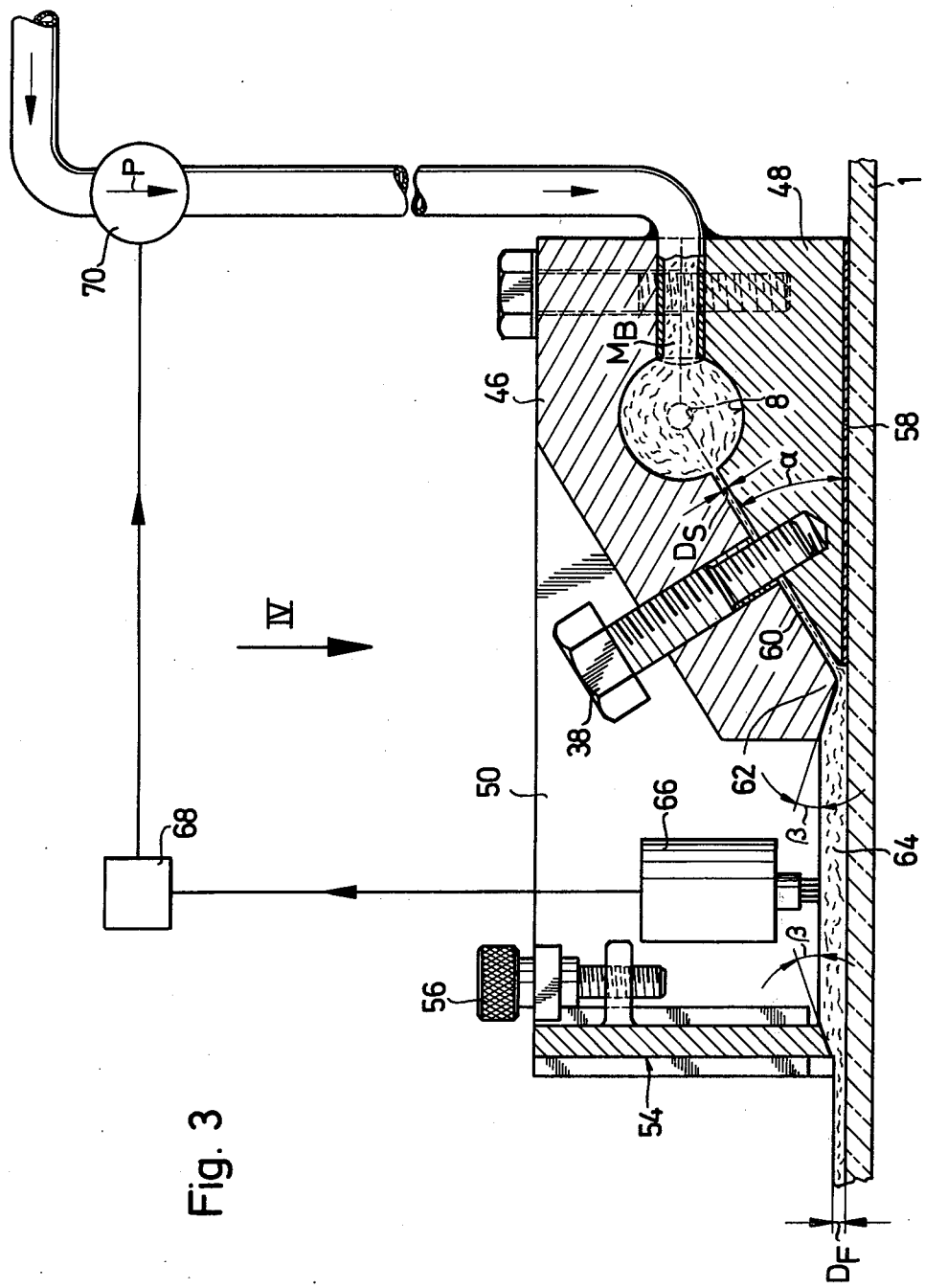
FIG. 3 illustrates a third embodiment of a film-forming head according to the invention, the view taken along the line III—III of FIG. 4.
Figure 4:
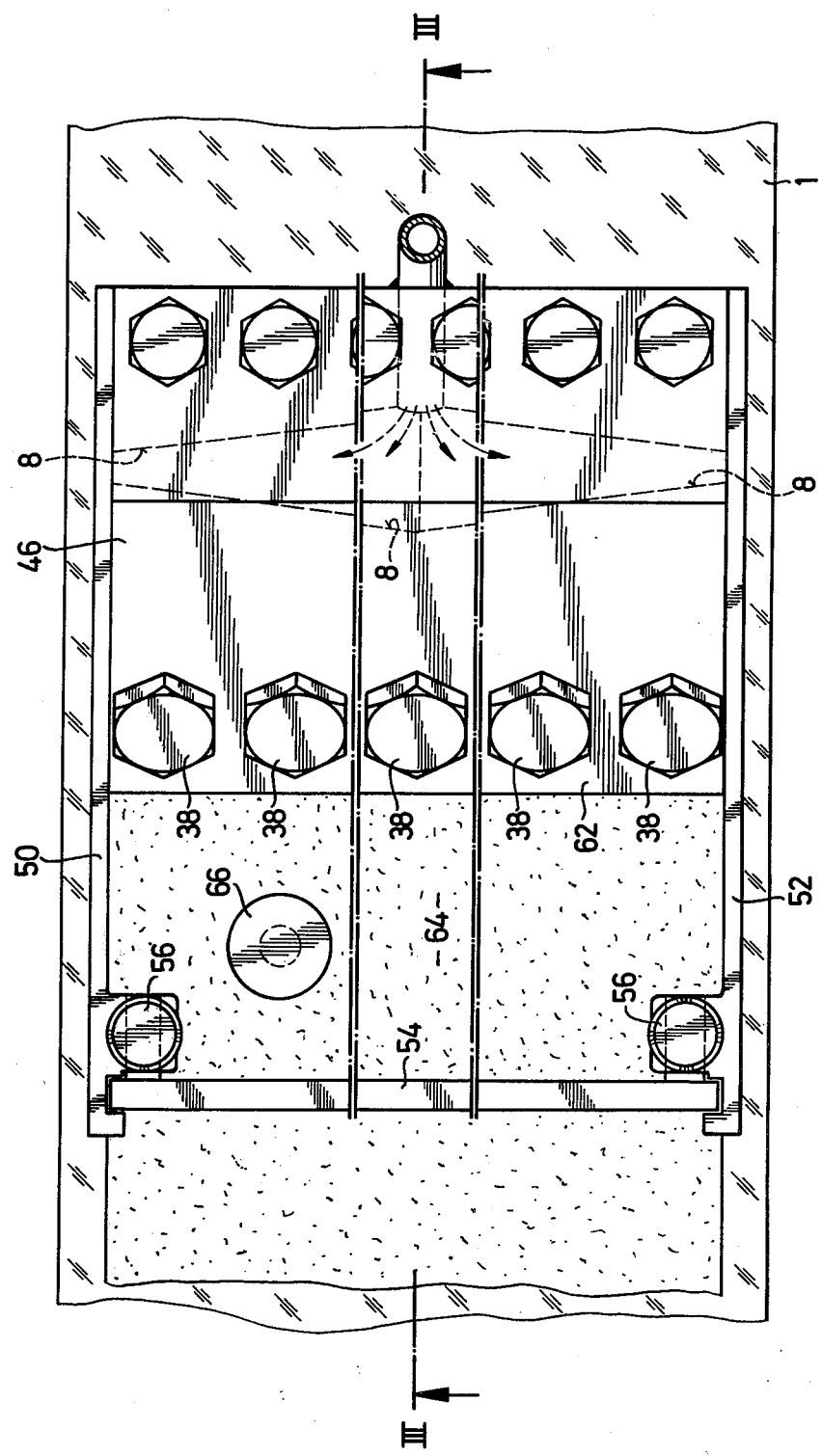
FIG. 4 is a plan view of the film-forming head shown in FIG. 3.

In the embodiment illustrated in FIGS. 3 and 4, the film-forming head is comprised of two die plates 46 and 48 that are flanked by side walls 50 and 52. A doctor blade 54 extends between the side walls opposite the plates 46 and 48. The distance $D_F$ of the doctor blade from the substrate can be adjusted by means of micrometer screws 6. The entire assembly rests on the substrate 1. For this reason, a layer 58 of an anti-friction plastic material is provided on the bottom surface of plate 48 and on the lower edges of side walls 50 and 52. Preferably, the film-forming head is mounted on a weight-reducing support so that the entire weight of the assembly is not placed on the substrate 1.

As in the FIG. 2 embodiment, the gap of slot 60 is adjusted by means of differential screws 38. The slot 60 is inclined at an acute angle $\alpha$ with relation to the substrate 1 so that the plastic material leaving the slot substantially retains its direction of flow. The rear lip 62 of the slot 60 is slanted upwardly and forms with the horizontal an acute angle $\beta$. The lower edge of the doctor blade 54 is also beveled and forms an acute angle $\beta$ with the horizontal. In addition, the inclination of the bottom surface of the doctor blade and the upper lip of the slot provided a gradual reduction or increase in the cross-section of the material, allowing the material to flow freely in all areas.

Between the slot and the doctor blade, a reserve of material in the form of layer 64 is formed. The thickness of the layer 64 is preferably less than 5 times the thickness $D_F$ of the film. Under these conditions, the reservoir is free of zones of stalled flow.

In order to maintain the height of the layer 64 constant, a measuring apparatus 66 that measures the level of the layer 64 is used.

For this purpose for example, a probe that operates on the principle of radioactive reflection can be used. The signals, corresponding to the level of the reservoir 64, are fed to a control device 68 that in turn controls the revolutions (speed) and thereby the discharge from the pump 70.

We claim:
1. Apparatus for forming films on a substrate from a flowable film-forming material comprising
   an elongate closed channel for receiving the film-forming material,
   a channel inlet located longitudinally along the channel for introducing film-forming material under pressure into the channel, the channel having a configuration such that the cross-sectional area of the channel, in planes normal to the longitudinal axis of the channel, decreases as the distance from the channel inlet increases, a narrow slot for feeding material from the channel to the substrate, the slot having an inlet in fluid communication with the channel and an outlet adapted to be spaced from the substrate, a forming member for forming the material fed onto the substrate by the slot into a film, the forming member being spaced from the outlet of the slot.

2. Apparatus as in claim 1, wherein the cross-section of the channel in planes normal to the longitudinal axis of the slot decreases linearly as the distance from the inlet increases.

3. Apparatus as in claim 1, wherein the channel inlet is located centrally of the channel with elongate portions of the channel extending laterally of the inlet, the cross-sectional area of each of said portions of channel, in planes normal to the longitudinal axis of each portion, decreasing as the distance from the inlet increases.

4. Apparatus for forming a film from a flowable material comprising a substrate on which the film is formed, a film-forming head adjacent the substrate for forming a film of the flowable material on the substrate, means for effecting relative transverse movement between the substrate and the film-forming head, means for supplying flowable material under pressure to the film-forming head, the film-forming head including an elongate closed channel for receiving the flowable material from the supply means and maintaining the material under pressure while the material is in the channel, a channel inlet located longitudinally along the channel for introducing flowable material from the supply means into the channel, a narrow slot for feeding flowable material from the channel onto the substrate, the slot having an inlet in fluid communication with the channel and an outlet spaced from the substrate, the channel having a configuration such that the cross sectional area of the channel, in planes normal to the longitudinal axis of the channel, decreases as the distance from the channel inlet increases, and a forming member, spaced from the substrate and from the outlet of the slot, for forming the flowable material into a film on the substrate.

5. Apparatus as in claim 4 wherein the longitudinal axis of the channel is transverse to the direction of relative movement between the substrate and the film-forming head, and wherein the inlet of the slot extends along substantially the entire length of the channel.

6. Apparatus as in claim 4 wherein the cross-sectional area of the channel in planes normal to the longitudinal axis of the channel decreases as a function of the distance from the channel inlet.

7. Apparatus as in claim 6 wherein the cross-sectional area of the channel decreases linearly in accordance with the distance from the channel inlet.

8. Apparatus as in claim 6 wherein the channel inlet is located centrally of the channel with elongate portions of the channel extending laterally therefrom, the cross-sectional area of each channel portion, in planes normal to the longitudinal axis of that portion, decreasing uniformly as the distance from the channel inlet increases.

9. Apparatus as in claim 4 wherein the distance between forming member and the substrate is less than the distance between the slot outlet and the substrate.

UNITED STATES PATENT AND TRADEMARK OFFICE
CERTIFICATE OF CORRECTION

PATENT NO. : 4,145,173
DATED : March 20, 1979
INVENTOR(S) : Rudolf Pelzer and Heinz Scholl It is certified that error appears in the above-identified patent and that said Letters Patent are hereby corrected as shown below:

Column 2, line 43 "first" should read --final--.

Column 4, line 26 "6" should read --56--.

Column 4, line 43 "provided" should read --provide--.

Signed and Sealed this

Twenty-fourth Day of July 1979

[SEAL]

Attest:

LUTRELLE F. PARKER
*Attesting Officer*     *Acting Commissioner of Patents and Trademarks*